UNITED STATES PATENT OFFICE.

ALONZO E. WEMPLE, OF BROOKLYN, NEW YORK.

FERTILIZER.

SPECIFICATION forming part of Letters Patent No. 330,075, dated November 10, 1885.

Application filed May 13, 1882. Serial No. 61,268. (No specimens.)

*To all whom it may concern:*

Be it known that I, ALONZO E. WEMPLE, of the city of Brooklyn, county of Kings, and State of New York, have invented a new and useful Improvement in Fertilizers, of which the following is a full, true, and exact description.

My invention relates to an improvement in fertilizers designed to aid in the growth of plants or of crops. As usually prepared it consists of a very light-colored powder or finely-reduced material.

My fertilizer is prepared by thoroughly mingling together the following ingredients: Fine bone-flour, fifty (50) per cent.; sulphate of ammonia, fifteen (15) per cent.; nitrate of soda, fifteen (15) per cent.; muriate of potash, five (5) per cent.; sulphate of magnesia, five (5) per cent.; nitrogenous matter, ten (10) per cent.

The nitrogenous matter may be either vegetable or animal; but I preferably use dried blood.

My fertilizer, when prepared, may be used either in a solid or liquid form. In the latter case it is to be mingled with water. When so mingled with water, the solution is substantially neutral, and is on this account very advantageous, as an acid solution is injurious to many plants.

My improved fertilizer is not injurious, and is suitable for any species of plants, being equally good for fine flowering plants and for crops.

My fertilizer is quite inodorous, and consequently can be used without disagreeable effects in dwelling-rooms.

It is plain that the proportions of the ingredients of my fertilizer may be varied without destroying the beneficial results which can be produced from it; but I prefer the proportions above stated.

What I claim as my invention, and desire to secure by Letters Patent, is—

The improved fertilizer consisting of a combination of bone-flour, sulphate of ammonia, nitrate of soda, muriate of potash, sulphate of magnesia, and nitrogenous matter, substantially as described.

ALONZO E. WEMPLE.

Witnesses:
GEO. H. EVANS,
WM. A. POLLOCK.